US009385625B1

(12) United States Patent
Kwong et al.

(10) Patent No.: US 9,385,625 B1
(45) Date of Patent: Jul. 5, 2016

(54) QUAD-ARRAY DIODE-LESS RF-TO-DC RECTIFYING CHARGE-PUMP CONVERTER FOR ENERGY HARVESTING

(71) Applicant: Hong Kong Applied Science & Technology Research Institute Company Limited, Hong Kong (HK)

(72) Inventors: Kwok Kuen (David) Kwong, Davis, CA (US); Yat Tung Lai, Hong Kong (HK); Ka Hung Kwok, Hong Kong (HK)

(73) Assignee: Hong Kong Applied Science and Technology Research Institute Company, Limited, Hong Kong (HK)

( * ) Notice: Subject to any disclaimer, the term of this patent is extended or adjusted under 35 U.S.C. 154(b) by 0 days.

(21) Appl. No.: 14/686,923

(22) Filed: Apr. 15, 2015

(51) Int. Cl.
*H02M 3/07* (2006.01)
*H02M 7/217* (2006.01)

(52) U.S. Cl.
CPC ............... *H02M 7/217* (2013.01); *H02M 3/07* (2013.01)

(58) Field of Classification Search
CPC ... H02M 3/07; H02M 3/33592; H02M 7/217; H02J 5/005; H02J 5/0025; H02J 7/025; H01F 38/14; H03K 3/537
USPC ............ 363/123, 125, 127; 307/43, 104, 110, 307/149
See application file for complete search history.

(56) References Cited

U.S. PATENT DOCUMENTS

| 6,922,097 | B2 | 7/2005 | Chan et al. | |
|---|---|---|---|---|
| 7,068,091 | B1 | 6/2006 | Kwong | |
| 8,111,105 | B1* | 2/2012 | Zhou | H03F 1/223 330/300 |
| 8,362,825 | B2* | 1/2013 | Bergler | H02M 3/073 327/536 |
| 8,552,597 | B2* | 10/2013 | Song | H02J 1/102 307/104 |
| 8,797,776 | B2 | 8/2014 | Kwong et al. | |
| 9,021,277 | B2* | 4/2015 | Shearer | G06K 19/0707 713/300 |
| 2004/0104761 | A1 | 6/2004 | Yen | |
| 2008/0143192 | A1 | 6/2008 | Sample et al. | |
| 2009/0152954 | A1* | 6/2009 | Le | H02J 17/00 307/110 |
| 2011/0101789 | A1* | 5/2011 | Salter, Jr. | H02M 7/217 307/104 |
| 2013/0229841 | A1 | 9/2013 | Giuliano | |

FOREIGN PATENT DOCUMENTS

CN 202987453 6/2013

* cited by examiner

*Primary Examiner* — Timothy J Dole
*Assistant Examiner* — Yemane Mehari
(74) *Attorney, Agent, or Firm* — Stuart T. Auvinen; gPatent LLC

(57) ABSTRACT

A RF-to-DC converter charges a battery or powers a circuit from the energy of received radio waves. The RF energy received is very small for far-field applications, so the converter is highly sensitive. Four capacitor arrays are arranged in two banks. Buffered RF signals pump bottom plates of the capacitors. A series of L-switches in each bank connect between the two capacitor arrays in that bank. Each L switch has a pre-charge switch that charges that stage's input capacitor, and a stage-transfer switch that shares charge from the input capacitor to an output capacitor for that stage. Switches in the two banks alternately pre-charge and pump, with the left bank pumping while the right bank pre-charges. Switches are transistors with substrates tied to their sources or actively driven by substrate control signals. One bank may use n-channel transistors with the other bank uses p-channel transistors. Gate voltages may be boosted.

20 Claims, 11 Drawing Sheets

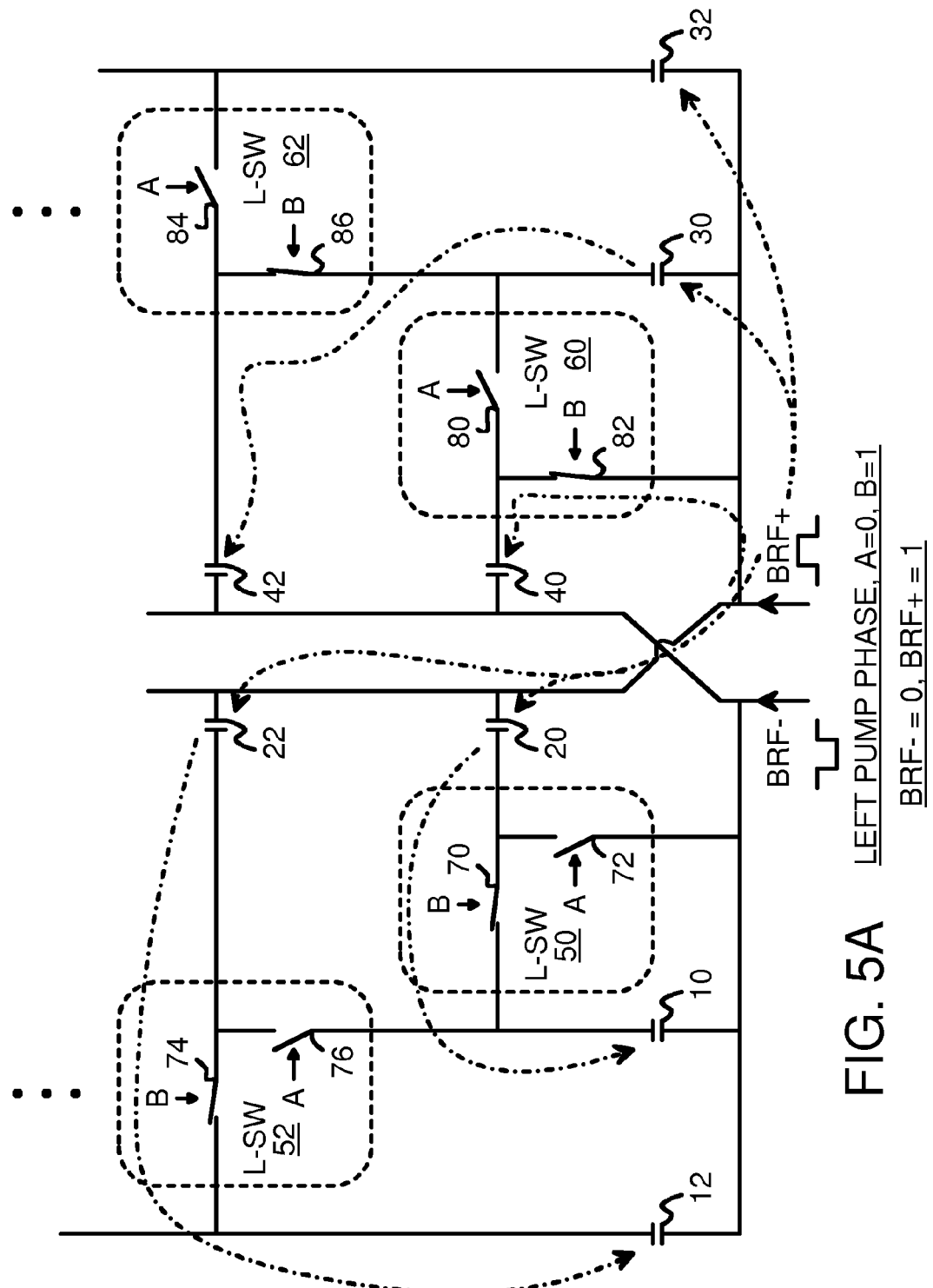
FIG. 5A  LEFT PUMP PHASE, A=0, B=1
BRF- = 0, BRF+ = 1

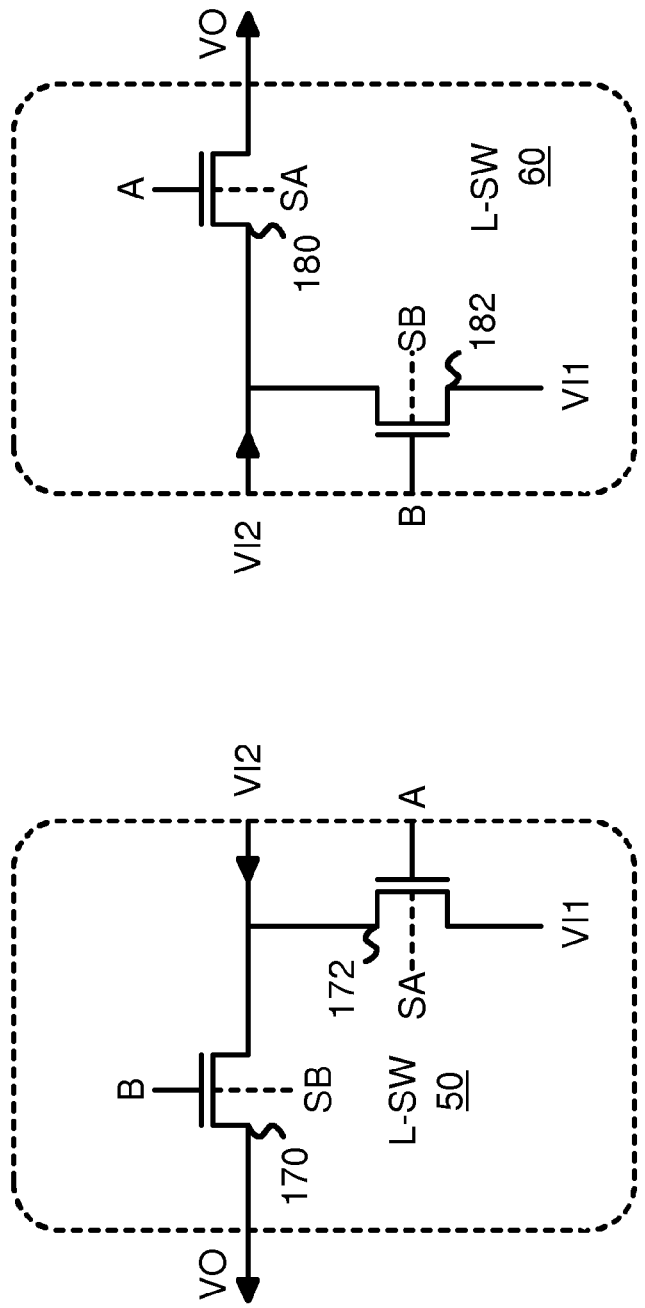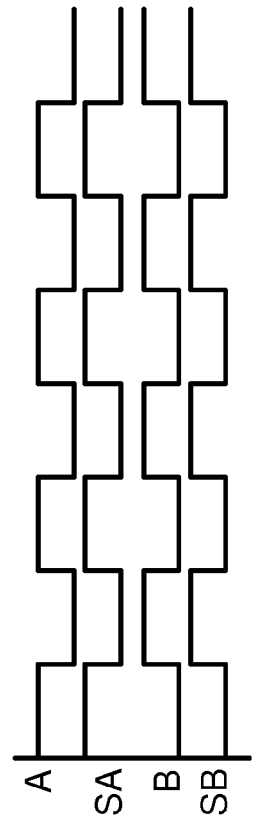

ND-DC RECTIFYING CHARGE-PUMP CONVERTER FOR ENERGY HARVESTING

QUAD-ARRAY DIODE-LESS RF-TO-DC RECTIFYING CHARGE-PUMP CONVERTER FOR ENERGY HARVESTING

FIELD OF THE INVENTION

This invention relates to Radio-Frequency (RF) to Direct Current (DC) conversion circuits, and more particularly to high-sensitivity energy harvesting circuits.

BACKGROUND OF THE INVENTION

Advances in semiconductor technology have allowed for increasingly sophisticated systems to be built in smaller packages. Small devices may contain circuitry to connect to the Internet and perform some useful function such as sensing temperature, heart rate, or acceleration, or controlling a camera, refrigerator, door lock, or automobile sub-system. A huge number of such connected devices will exist in the Internet of Things (IoT).

Connections without wires (Wireless connections) are often preferred to connections with wires to minimize installation costs. Most of these connected devices will be battery powered, but some will derive energy from external electromagnetic radiation (EM) such as radio waves. Energy harvesting circuits extract energy from an external EM source to power a circuit or recharge a battery.

Near-Field Communication (NFC) circuits have receivers placed very close to transmitters, such as within a few centimeters or almost touching. However, most connected devices are not placed so close to receivers. NFC has a higher energy transfer than does far-field. Thus NFC power harvesting is not available for many connected devices since they are positioned too far from transmitters for near-field effects.

FIG. 1 shows a far-field energy harvesting application. Hub or base station 142 transmits Radio-Frequency (RF) waves to connected devices 140. Internet Protocol (IP) packets may be encoded and transmitted by the RF waves. Connected device 140 may transmit return packets back to base station 142 that include acknowledgements and sensor data.

Connected device 140 may have a small battery or capacitor that is recharged from energy received from base station 142. RF wave energy is converted to Direct Current (DC) power by an energy harvesting or RF-to-DC converter circuit in each of connected devices 140. When RF energy from base station 142 is received, connected devices 140 may wake up and perform various programmed functions.

The distance from base station 142 to connected device 140 varies but is typically well beyond the near-field boundary, and far-field energy transfer is much less efficient and lossy than for near-field. The theoretical energy transferred is dependent on the RF frequency, transmitted power, and distance between base station 142 and connected device 140. For example, a 900 MHz RF transmission from base station 142 results in only 28 µW (micro-Watts) of a 74 mV signal received by a 50-Ohm antenna on connected device 140 that is placed 10 meters from base station 142.

Dickson charge pumps and other rectifiers have been used as energy harvester circuits. However, the input sensitivity and power conversion efficiency are insufficient for many applications. Transistor threshold voltages may consume too much of the small available input signal from a tiny antenna. Diodes or diode-connected transistors have too large of a voltage drop across them, thus consuming too much of the small input signal.

FIG. 2 is a block diagram of a connected device that obtains power from an external RF transmission. Connected device 140 has base band processor 102 that executes programs or routines in EEPROM 104, such as to read sensor 116 through interface analog-to-digital converter (ADC) 106. Base band processor 102 embeds sensor data into an IP packet that is sent by transmitter 112 through antenna 122 to an external base station. Packets from the base station received by antenna 122 are received by receiver 108 and processed by base band processor 102.

RF-to-DC converter 110 receives the signal from antenna 122 and generates a DC voltage to charge capacitor 114. Capacitor 114 acts as a battery to power all components of device 120 and sensor 116. Since the amount of power received by antenna 122 is very small for RF waves, RF-to-DC converter 110 must be highly efficient and very sensitive. Low ripple on the output is desirable so that a smaller capacitor 114 may be used.

What is desired is a RF-to-DC converter for low-power applications such as for connected devices. A RF-to-DC converter that is highly efficient yet very sensitive is desirable. An energy-harvesting circuit using a standard complementary metal-oxide-semiconductor (CMOS) process that can convert small voltages generated by RF waves that are not near-field is desirable.

BRIEF DESCRIPTION OF THE DRAWINGS

FIGS. 5A-B show operation of the first L-switches during pre-charge and pump phases.

FIGS. 9A-B show active substrate controls to n-channel transistors in the L-switches.

DETAILED DESCRIPTION

The present invention relates to an improvement in RF-to-DC converters. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 3:
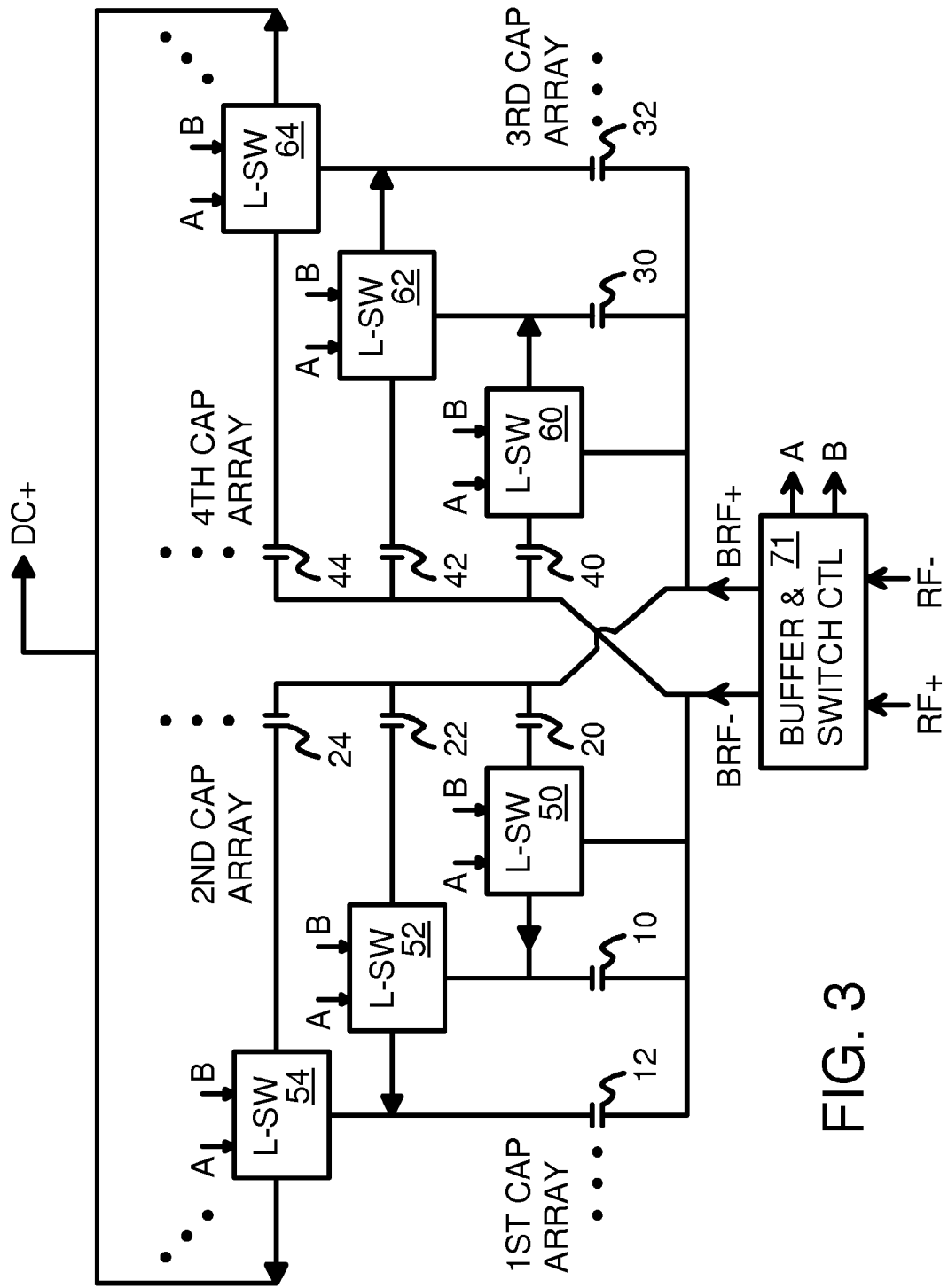
FIG. 3 is a diagram of a RF-to-DC converter using a dual-bank L-switch network with four capacitor arrays.

FIG. 3 is a diagram of a RF-to-DC converter using a dual-bank L-switch network with four capacitor arrays. An RF signal RF+, RF− is received from an antenna and converted to a DC output DC+ that can charge a capacitor or battery to harvest RF energy. The capacitor or battery can be connected between DC+ and a ground.

Buffer and switch control 71 receives RF+, RF− and buffers these signals to generate buffered RF signals BRF+, BRF−. These signals modulate with the RF signal swings and pump the bottom plates of capacitors in four capacitor arrays.

BRF+ pumps the bottom plates of capacitors 20, 22, 24 in the second capacitor array and the bottom plates of capacitors 30, 32 in the third capacitor array. BRF− pumps the bottom plates of capacitors 10, 12 in the first capacitor array and the bottom plates of capacitors 40, 42, 44 in the fourth capacitor array.

L-switches 50, 52, 54, 60, 62, 64 each act as valves to isolate and then transfer pumped charge from one capacitor to another capacitor. A series of such L-switches increases the voltage of the charge being pumped. Thus the voltage output by L-switch 52 is higher than the voltage output by L-switch 50. The final L-switch in the series drives the DC+ output with the highest pumped voltage. Thus a small RF+RF− input voltage is increased by charge pumping to generate a DC output voltage.

Each of L-switches 50, 52, 54, 60, 62, 64 has two MOS transistors in an inverted L arrangement. The gates of the two transistors are controlled by control signals A, B that are generated by buffer and switch control 71. Thus diode-connected switches are not used, avoiding large voltage drops in the switches.

L-switches 50, 52, 54, and capacitors 10, 12, 20, 22, 24 form a left-side bank while L-switches 60, 62, 64, and capacitors 30, 32, 40, 42, 44 form a right-side bank. When the left-side bank is in a pumping phase, the right-side bank is in a pre-charge phase. Thus pumping is alternated between the two banks. Output ripple on the DC+ output is reduced by having two bank alternately pumping the same node. The left-side bank's output from L-switch 54 is connected to the right-side bank's output from L-switch 64.

The number of stages may be increased in each bank to obtain a desired output voltage DC+. For example, a fourth stage may be added by adding another L-switch 50 after L-switch 54. This fourth left-bank L-switch (not shown) would have another capacitor 20 (not shown) in the second capacitor array between the right input to the fourth L-switch and BRF+, and another capacitor 10 (not shown) in the first capacitor array between the bottom input to the fourth L-switch and BRF−. Likewise, a fourth right-bank L-switch (not shown) would another capacitor 40 (not shown) in the fourth capacitor array between the left input to the fourth left-bank L-switch and BRF−, and another capacitor 30 (not shown) in the third capacitor array between the bottom input to the fourth left-bank L-switch and BRF+.

Figure 4:
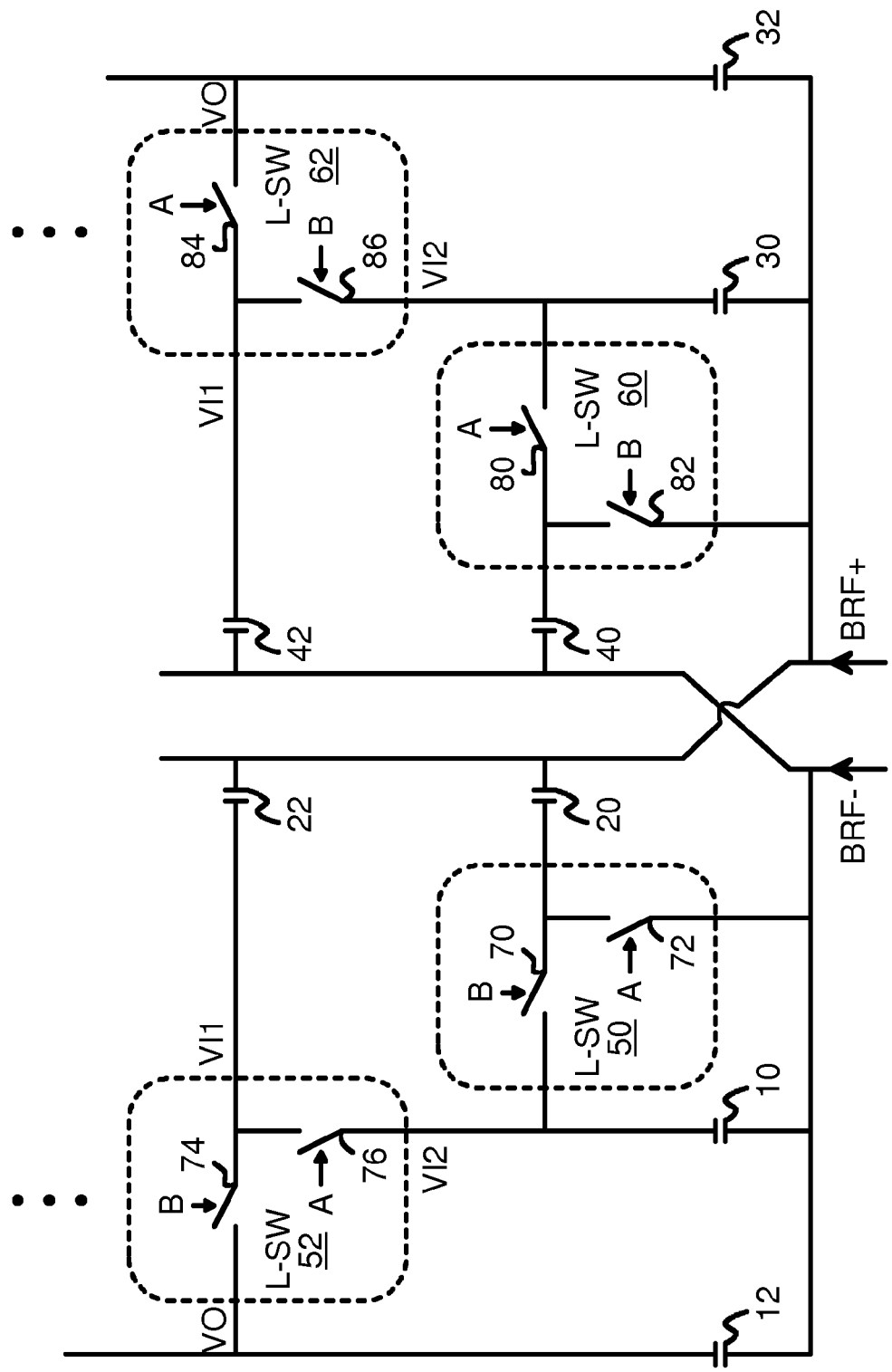
FIG. 4 is a schematic showing the first few stages of L-switches in more detail.

FIG. 4 is a schematic showing the first few stages of L-switches in more detail. L-switch 50 has stage-transfer switch 70 and pre-charge switch 72. The purpose of pre-charge switch 72 is to pre-charge the input capacitor 20 while the purpose of stage-transfer switch 70 is to transfer charge to the next stage, from capacitor 20 to capacitor 10.

The control signals A, B alternate to open and close switches 70, 72. When stage-transfer switch 70 is closed, pre-charge switch 72 is open. Similarly, when stage-transfer switch 70 is open, pre-charge switch 72 is closed. Ideally A and B are non-overlapping, but a slight overlap may still allow pumping to operate without large losses in efficiency.

The A and B controls are swapped for L-switches 50, 52, 54, compared with L-switches 60, 62, 64. Control signal A is applied to pre-charge switches 72, 76 in the left bank, but to stage-transfer switches 80, 84 in the right bank. Control signal B is applied to pre-charge switches 82, 86 in the right bank, but to stage-transfer switches 70, 74 in the left bank. Swapping the control signals for the left and right bank causes the two banks to alternate.

Figure 5B:
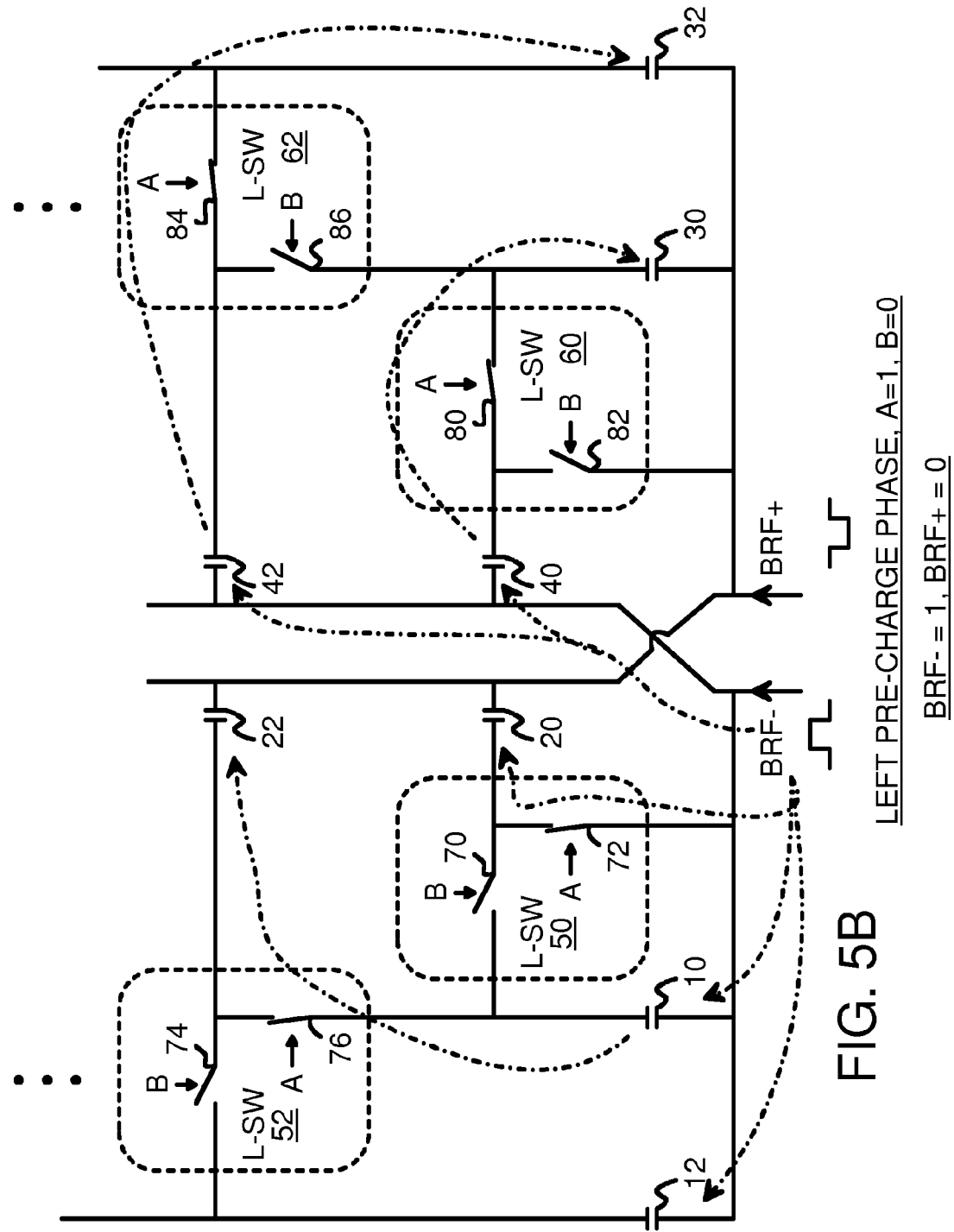

FIGS. 5A-B show operation of the first L-switches during pre-charge and pump phases. In FIG. 5A, the left bank is in the pump phase and the right bank is in the pre-charge phase.

A is low and B is high, and BRF− is low or falling and BRF+ is high or rising. However, in FIG. 5B, the left bank is in the pre-charge phase and the right bank is in the pump phase. A is high and B is low, and BRF− is high or rising and BRF+ is low or falling.

In FIG. 5A, pre-charge switch 72 is opened by signal A low and stage-transfer switch 70 is closed by signal B high. The net positive charge on the left or top plate of capacitor 20 is shared through stage-transfer switch 70 with the top plate of capacitor 10. Since BRF− is falling low and BRF+ is rising high, charge is pushed from capacitor 20 to capacitor 10 through stage-transfer switch 70.

Similarly, BRF+ rising couples positive charge through capacitor 22, which then passes through stage-transfer switch 74 to the top plate of capacitor 12. The falling BRF− on the bottom plate of capacitor 12 helps attract the charge to the top plate of capacitor 12.

In FIG. 5B, when A is high and B is low, the additional charge on the top plate of capacitor 10 is pushed up through pre-charge switch 76 in L-switch 52 to pre-charge capacitor 22. Also, pre-charge switch 72 closes to allow BRF− to pre-charge the left or top plate of capacitor 20. BRF− rising also couples through capacitor 12, causing its top plate to rise in voltage.

The voltage on the top plate of capacitor 10 will have a higher value than BRF− due to the charge pumping action and coupling of the rising swing of BRF− through capacitor 10. Likewise, the top plate of capacitor 12 will have a higher value than the top plate of capacitor 10. Thus the voltages increase for successive stages in each bank.

In the next cycle, FIG. 5A, pre-charge switch 76 opens and stage-transfer switch 74 is closed by B being high. Charge from the top plate of capacitor 22 is transferred through stage-transfer switch 74 to the top plate of capacitor 12. The output voltage on the top plate of capacitor 12 is larger than the input voltage on the top plate of capacitor 10. Each successive stage increases the output voltage until leakage or other inefficiencies stop further voltage increases as stages are added.

The right bank performs the opposite operations as does the left bank during each phase. In FIG. 5A, when the left bank is pumping, the right bank is pre-charging. Pre-charge switches 82, 86 are closed, allowing BRF+ to charge the right or top plate of capacitor 40 through pre-charge switch 82. The charge on the top plate of capacitor 30 is pushed up by coupling of BRF+ rising, through pre-charge switch 86 to the top/right plate of capacitor 42.

In FIG. 5B, when the left bank is pre-charging, the right bank is pumping. A is high and B is low, and BRF− is rising and BRF+ is falling. Pre-charge switches 82, 86 are open and stage-transfer switches 80, 84 are closed. As BRF− rises, coupling through capacitors 40, 42 raises the voltages on their right or top plates. The higher top-plate voltage of capacitor 40 drives charge through stage-transfer switch 80 to the top plate of capacitor 30. Also, the higher top-plate voltage of capacitor 42 drives charge through stage-transfer switch 84 to the top plate of capacitor 32.

Successively higher voltages are generated on the top plates of capacitors 30, 32, as is true for capacitors 10, 12 on the left bank. The final capacitor's top plates can be connected together as the output node. Any ripple can be filtered by a capacitor on the output node. The output ripple is less than if only one bank were used, so a smaller output capacitor can be used.

Figure 6:
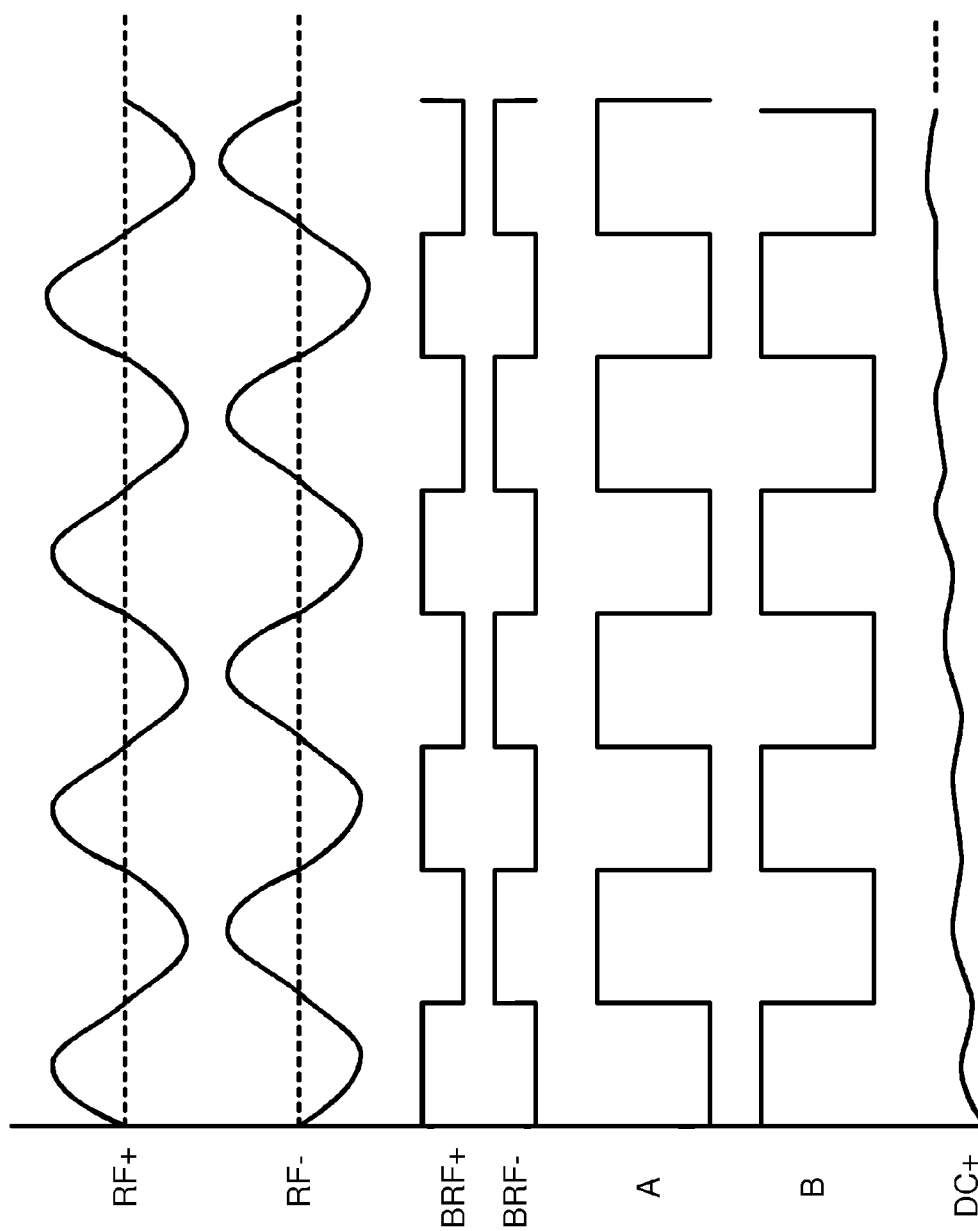
FIG. 6 is a timing diagram of control signals for the circuit of FIGS. 3-5.

FIG. 6 is a timing diagram of control signals for the circuit of FIGS. 4-5. RF+ and RF− are sinusoidal inputs from an antenna that receives radio waves. Buffering produces buffered signals BRF+, BRF−. In this example BRF+ has the same polarity as RF+. Control signals A and B are alternately high and low with the same frequency as BRF+, BRF−. B is high when RF+ and BRF+ are high, while A is high when RF− and BRF− are high. The final output from the last stage L-switch in the left band and right bank are combined as output node DC+. The voltage of DC+ rises with each cycle from start-up until a steady-state voltage is reached.

Figure 7:
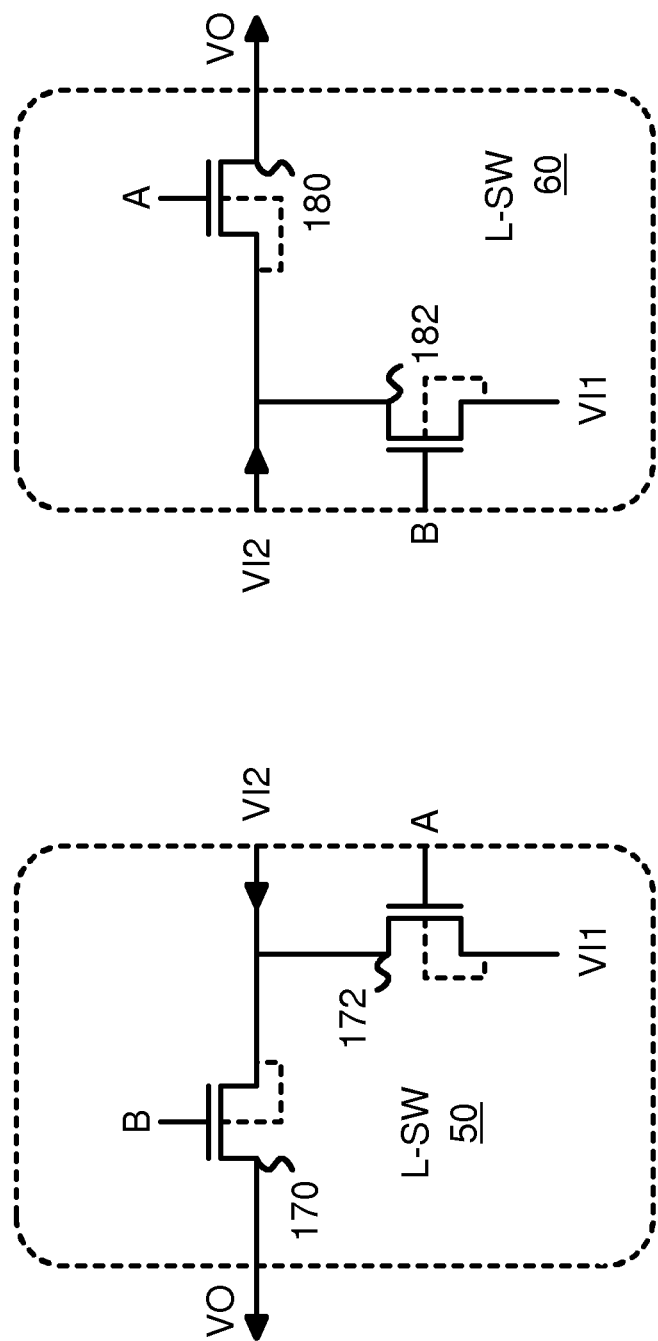
FIG. 7 shows an NMOS implementation of the L-switches.

FIG. 7 shows an NMOS implementation of the L-switches. L-switch 50 uses n-channel transistors for stage-transfer switch 70 and pre-charge switch 72. However, each transistor is formed in its own well. The substrate node of stage-transfer transistor 170 is connected to its source, node VI2, while the substrate node of pre-charge transistor 172 is connected to its source, node VI1. When the gate voltage is high, conduction may occur for an n-channel transistor.

In the right bank, L-switch 60 also uses n-channel transistors, each formed in its own well. The substrate node of stage-transfer transistor 180 is connected to its source, node VI2, while the substrate node of pre-charge transistor 182 is connected to its source, node VI1. The control signals are reversed for L-switch 60 compared with L-switch 50. L-switch 50 has A applied to the gate of pre-charge transistor 172 and B applied to the gate of stage-transfer transistor 170, but A and B are reversed for L-switch 60. In L-switch 60, control signal B is applied to the gate of n-channel pre-charge transistor 182 and control signal A is applied to the gate of n-channel stage-transfer transistor 180. VO are the output nodes to the next stage in the bank.

Figure 8:
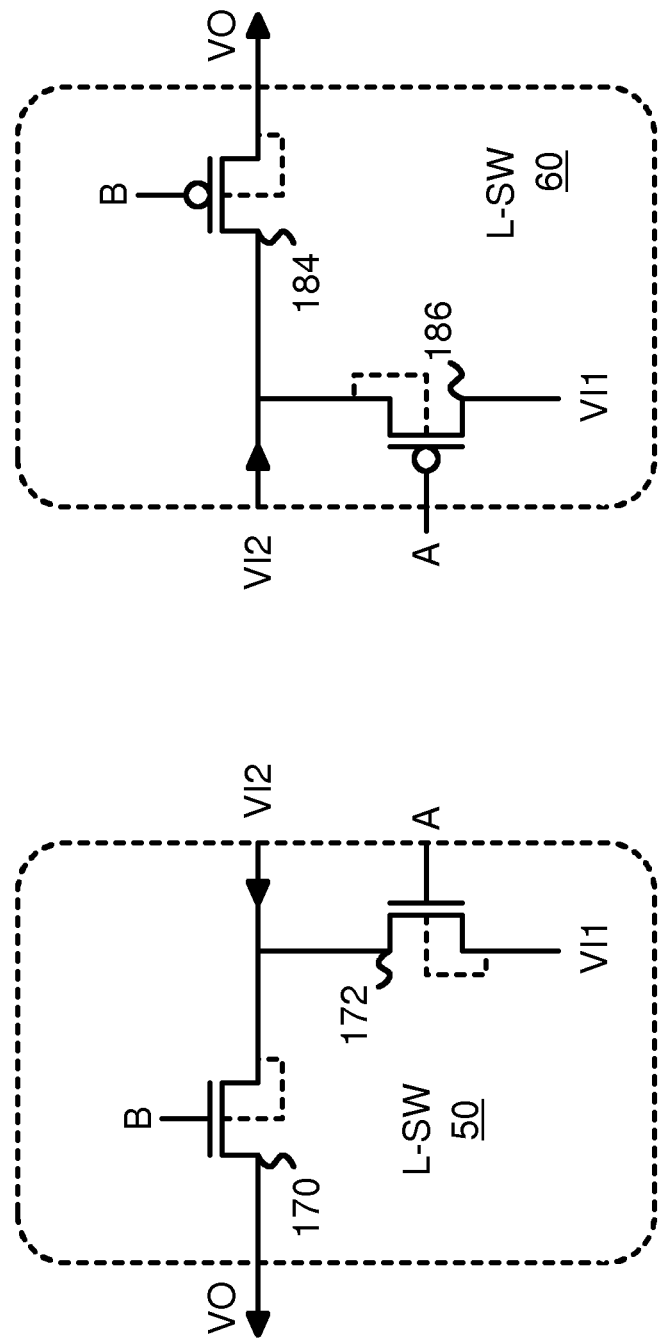
FIG. 8 shows a CMOS implementation of the L-switches.

FIG. 8 shows a CMOS implementation of the L-switches. L-switch 50 for the left bank uses n-channel transistors for stage-transfer switch 70 and pre-charge switch 72. However, L-switch 60 for the right bank uses p-channel transistors: p-channel stage-transfer transistor 184 and p-channel pre-charge transistor 186.

Each transistor is formed in its own well. The substrate node of stage-transfer transistor 170 is connected to its source, node VI2, while the substrate node of pre-charge transistor 172 is connected to its source, node VI1. When the gate voltage is high, conduction may occur for an n-channel transistor.

For L-switch 60, p-channel stage-transfer transistor 184 has its bulk node connected to its source node, VO. P-channel pre-charge transistor 186 has its bulk connected to its source, VI2. Note that the source nodes are reversed for p-channel transistors compared with n-channel transistors.

In the right bank, the control signals the same as for the left bank. In L-switch 60, control signal A is applied to the gate of p-channel pre-charge transistor 186 and control signal B is applied to the gate of p-channel stage-transfer transistor 184. For p-channel transistors, the gate signals are active when low, causing channel conduction when the gate has a lower voltage than the source.

When A is high, n-channel pre-charge transistor 172 turns on. B is low when A is high, and the low B turns on p-channel stage-transfer transistor 184.

When B is high, n-channel stage-transfer transistor 170 turns on. A is low when B is high, and the low A turns on p-channel pre-charge transistor 186.

During a first phase when A is high and B is low, n-channel pre-charge transistor 172 is on and n-channel stage-transfer transistor 170 turns off. VI1 is connected to VI2 for L-switch 50. In L-switch 60, p-channel stage-transfer transistor 184 turns on and p-channel pre-charge transistor 186 turns off.

During a second phase when A is low and B is high, n-channel pre-charge transistor 172 is off and n-channel stage-transfer transistor 170 turns on. VO is connected to VI2 for L-switch 50. In L-switch 60, p-channel stage-transfer transistor 184 turns off and p-channel pre-charge transistor 186 turns on.

FIGS. 9A-B show active substrate controls to n-channel transistors in the L-switches. Rather than connect the bulk or substrate node to each transistor's source, the bulk or substrate nodes are actively driven by control signals.

In FIG. 9A, L-switch 50 has n-channel stage-transfer transistor 170 with its substrate node actively driven by control signal SB. The substrate node of n-channel pre-charge transistor 172 is driven by control signal SA.

In L-switch 60, the substrate of n-channel stage-transfer transistor 180 is driven by control signal SA while its gate is driven by control signal A. The substrate of n-channel pre-charge transistor 182 is driven by control signal SB while its gate is driven by control signal B. Thus both the gate and the substrate nodes are actively driven high and low together.

FIG. 9B is a timing diagram showing actively driving substrates of the L-switch transistor. When control signal A goes high, substrate control signal SA also goes high. When control signal A goes low, substrate control signal SA also goes low.

Likewise, when control signal B goes high, substrate control signal SB also goes high. When control signal B goes low, substrate control signal SB also goes low. However, the voltage levels for the A control signal do not have to match the voltage levels for the SA control signal. When the low is ground, the high may be double the power voltage when a VDD doubler is used for A. However, the substrate control signals SA, SB may be pulsed high to only VDD. The higher A, B signals improve gate drive while limiting the substrates to VDD reduces the danger of latch-up. SA and SB can be pulsed high only momentarily to prevent latchup from a longer sustained forward biasing of the substrates. The timing diagram is not to scale. The actual high and low voltages for control signals A, B, SA, SB can be set for the particular process used.

Driving the substrate in the same direction as the gate decreases the reverse bias on the substrate, and eventually forward biases the substrate to drain junction, allowing the channel to form more easily, lowering the effective threshold voltage to turn on the transistor. Guard bands may be added to prevent latch-up due to the forward biased substrate junction. For higher frequencies, the substrate is forward biased only momentarily.

Figure 10:
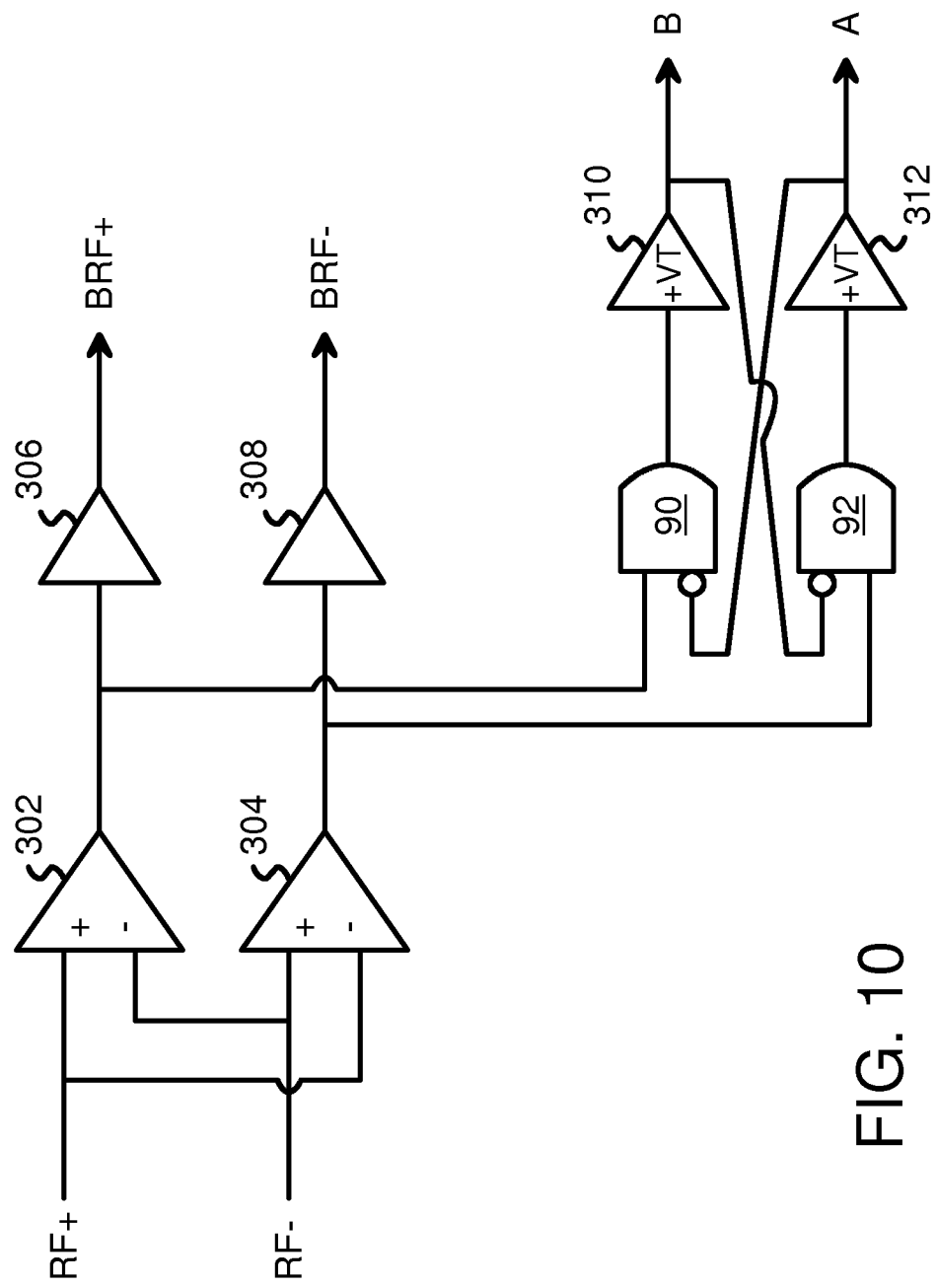
FIG. 10 is a schematic of the buffer and switch control.

FIG. 10 is a schematic of the buffer and switch control. Buffer and switch control 71 of FIG. 3 generates control signals from RF+, RF−. Radio wave signals received by an antenna produce a small signal on RF+, RF−. Amplifiers 302, 304 are differential comparators that amplify the difference between RF+ and RF−, and the outputs of amplifiers 302, 304 are buffered by buffers 306, 308 to generate buffered signals BRF+, BRF− that drive the bottom plates of capacitors in FIGS. 3-5.

Control signals A, B are generated from the outputs of amplifiers 302, 304 using make before break logic. AND gates 90, 92 receive the outputs of amplifiers 302, 304 and also receive the cross-coupled inverses of A and B generated by voltage boosting buffers 310, 312, which receive the outputs of AND gates 90, 92.

Voltage boosting buffers 310, 312 boost the high voltages of control signals A, B to one threshold above the power-supply voltage. A single stage pump such as for L-switch 50 may be used, along with an oscillating signal such as BRF+, BRF−, or some other oscillating signal. A voltage doubler may be used. See for example U.S. Pub. No. 20040104761. Higher stages may not have their voltages boosted as far over threshold as do lower stages.

The boosted high voltage for control signals A, B allows the transistor switches to turn on even when the source voltages are themselves boosted. When more stages are used, A and B can be boosted to higher multiples of the power supply voltage VDD. The channel or ON resistance of transistor switches is reduced by using a boosted gate voltage.

Figure 11:
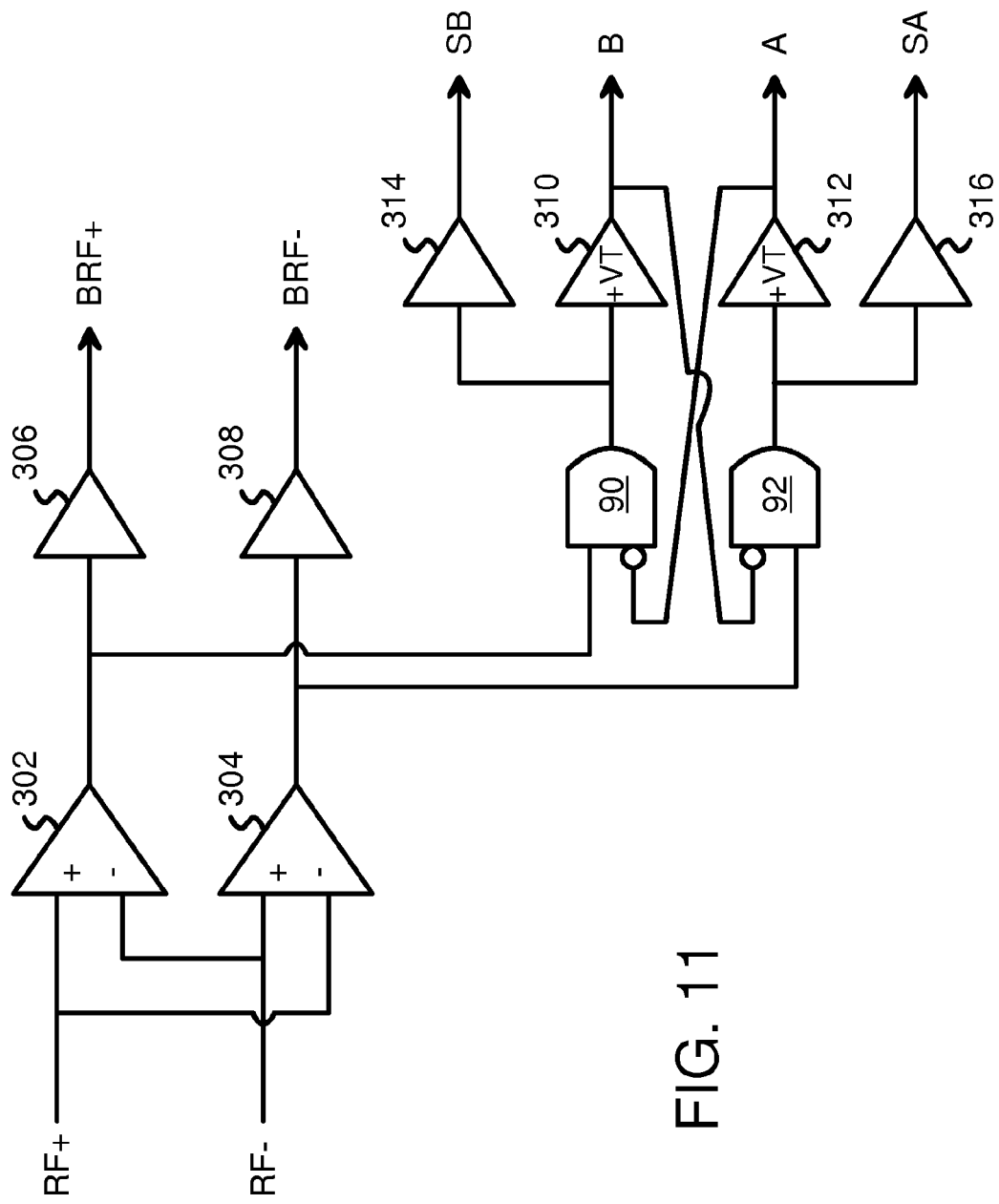
FIG. 11 is a schematic of the buffer and switch control that also generates active substrate control signals.

FIG. 11 is a schematic of the buffer and switch control that also generates active substrate control signals. Buffer and switch control 71 of FIG. 3 generates control signals A, B, SA, SB from RF+, RF−, for use with the L-switches of FIG. 9A. The circuit generates BRF+, BRF−, A, and B as described for FIG. 10. However, substrate buffer 314 generates substrate control signal SB from the input to voltage boosting buffer 310, which generates B. Thus B and SB have the same logical waveforms, and are high at the same time and low at the same time, although high voltages may differ.

Likewise, substrate buffer 316 generates substrate control signal SA from the input to voltage boosting buffer 312, which generates A. Thus A and SA have the same logical waveforms, and are high at the same time and low at the same time, although high voltages may differ.

Alternate Embodiments

Several other embodiments are contemplated by the inventors. For example a triple-well CMOS process could be used to form each p-channel and n-channel transistor in its own well. When only n-channel transistors are used for L-switches 50, 60, a standard P-Well CMOS process could be used. Various process enhancements could be used such as implants to adjust transistor characteristics and thresholds, barriers, guard rings, deep well implants, metalized gates, multi layer gates, stacked transistors, transistors or various geometries and layouts, etc. Silicon-on-Insulator (SOI) may be used to provide separate wells.

Both p-channel and n-channel transistors could be used with one or both having actively driven substrates. For example, only the n-channel transistors but not the p-channel transistors could have their substrates driven by SA, SB. The voltage high and low levels could be adjusted and could be different for n-channel and p-channel transistors. The rise and fall times and relative phases of control signals could be adjusted to improve performance or reduce feed-through or cross-talk, or for other reasons.

While a sample application has been described, the invention may be applied for many other applications with many kinds of devices. Various kinds of connected devices or other kinds of devices may be powered or partially powered by the invention. A battery or capacitor may or may not be present. Multiple power sources could be used, with the invention as a back-up power source, such as for use in emergencies when main power fails.

The sizes of capacitors in the arrays do not have to all be the same. Larger capacitors could be used in some locations to enhance pumping or charge sharing, or a sequence of increasing or decreasing capacitor sizes could be used in an array. The transistor sizes do not have to be the same. The left and right banks could have different transistor and capacitor sizes, especially when p-channel transistors are used in one bank and n-channel transistors in the other bank. The number of stages in each bank may be 3 as shown in FIG. 3, or may be a larger or smaller number. The RF signals does not have to be a perfect sinusoidal wave but may be a carrier wave with a signal superimposed over it, or may be another kind of wave shape. Various frequencies could be used, and Frequency Modulation, Amplitude-Modulation (AM), or some other kind of encoding used to carry the encoded data signal. Many alternatives are possible for buffer and switch control 71, and the control signal timings may be adjusted such as by adding delays, delay lines, R-C delays, filters, buffers, inverters, etc.

Charges may be considered to be positive or negative. A negative charge has negative carriers that move in a reverse direction when compared to positive charges.

While a theoretical description of operation of the circuit has been presented, the actual circuit operation may use or include other physical mechanisms, especially for smaller transistor sizes.

Separate signals may be generated to drive the each gate of p-channel transistors or n-channel transistor, or groups of gates. Additional boost drivers may be added for separately driven gate control signals. An internal ground may be floating relative to the reference ground or to an external ground, and p-channel transistors may turn on and off when VSS is not exactly equal to the external ground. The range of boost voltages may be adjusted, such as to swing down to −1 volt instead of 0 volt, to more fully turn on some transistors. Also, a parasitic source-to-bulk diode in transistor may turn on to clamp VSS to near zero volts.

Comparators 302, 304 and boost drivers 310, 312 may connect to an external A.C. ground, or to the common-mode voltage, or to the reference ground, or to the internal ground VSS, or to another voltage. There may be several internal ground busses, such as for digital ground, analog ground, I/O ground, etc. These grounds may be isolated from each other except through resistors or capacitors, or may be connected together such as near a ground pin or externally.

While a sine-wave RF input has been described, the RF input may have a square wave, irregular waves, modulated waves, or other wave shapes. The waves may vary from cycle to cycle, such as when carrying encoded information.

Boost drivers 310, 312 may use other charge-pump circuits or voltage-boosting methods. See for example U.S. Pub. No. 20040104761.

Figure 1:
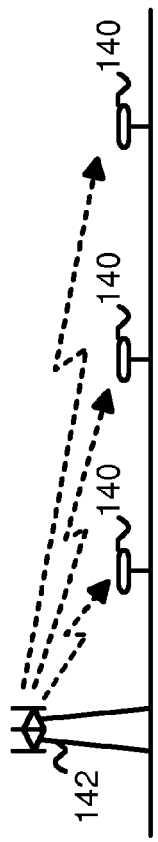
FIG. 1 shows a far-field energy harvesting application.
Figure 2:
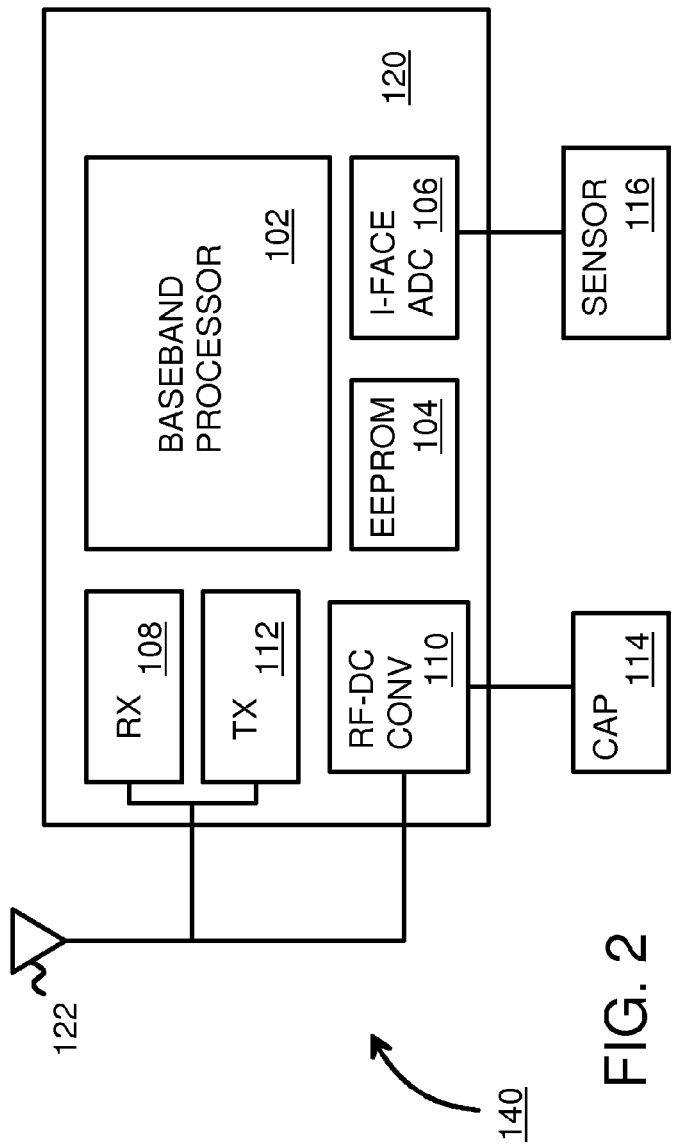
FIG. 2 is a block diagram of a connected device that obtains power from an external RF transmission.

While an application of RFID devices has been shown, the low-voltage rectifier could be used in other applications, especially those that have a very low A.C. voltage as an input, whether the A.C is ultimately from a received RF or other frequency signal, or from some other source. Connected devices may have other block diagrams than that shown in FIG. 2. Comparators 302, 304 could be an op amp, a differential amplifier, a current-steering amplifier, or another kind of amplifier. The comparator may be a high-gain differential amplifier with good output swing, or may be another kind of amplifier or comparator. The comparator could have a pair of p-channel differential transistors, each connected to ground through n-channel transistors such as a current mirror, with a p-channel tail transistor to VDD.

The voltages shown and described are but one example. Other values of RF+, RF− may be used, and other transistor properties and sizes may result in other values of VDD, VDC, various grounds, and internal nodes. Power capacitors may be external or internal, and may include parasitic capacitances.

The boosted gate voltages applied to the gates of p-channel transistors are designed to cause these transistors to conduct in the linear region, which occurs when the gate voltage is at least one transistor threshold below the lowest of the source and drain voltages, for a p-channel transistor.

N-channel rather than p-channel transistors may be used for some technologies or processes, and inversions, buffers, capacitors, resistors, gates, or other components may be added to some nodes for various purposes and to tweak the circuit. Timings may be adjusted by adding delay lines or by controlling delays in leading-edge blocking units. Pulse generators could also be added. The inverting and non-inverting inputs to the comparator may be swapped and the polarity of the output reversed. Enabling and disabling the circuit could be accomplished with additional transistors or in other ways. Pass-gate transistors or transmission gates could be added for isolation. Switches may be implemented as n-channel or p-channel transistors, or as transmission gates with parallel p-channel and n-channel transistors. Input resistors and/or capacitors could be added to RF+, RF−, or other nodes, or more complex input filters used. For high voltage applications, the switch can use Laterally-Diffused Metal-Oxide-Semiconductor (LDMOS) transistors or Micro-Electro-Mechanical Switches (MEMS) with a similar controlling scheme.

The comparator may also use other topologies, such as folded cascode, current mirror, two-stage op amps with a differential pair, folded cascode, or current mirror as the first stage, or multiple stages with a differential pair, folded cascode, or current mirror as the first stage.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A RF-to-DC converter comprising:
    a first Radio-Frequency (RF) input and a second RF input that receive a RF signal from an antenna;
    a buffer circuit for generating a first buffered RF signal and a second buffered RF signal from the first and second RF input, and for generating a first control signal and a second control signal;
    wherein the first control signal and the second control signal alternately indicate a pre-charge phase and a pumping phase;
    a first array of capacitors having bottom plates receiving the second buffered RF signal;
    a second array of capacitors having bottom plates receiving the first buffered RF signal;
    a first bank of L-switches, each L-switch coupled between an input capacitor in the second array of capacitors and an output capacitor in the first array of capacitors;
    a third array of capacitors having bottom plates receiving the first buffered RF signal;
    a fourth array of capacitors having bottom plates receiving the second buffered RF signal;
    a second bank of L-switches, each L-switch in the second bank coupled between an input capacitor in the fourth array of capacitors and an output capacitor in the third array of capacitors;
    wherein each L-switch comprises:
    a pre-charge transistor that charges the input capacitor during the pre-charge phase;
    a stage-transfer transistor that transfers charge from the input capacitor to the output capacitor during the pumping phase;
    wherein the first control signal and the second control signal are connected to the first bank of L-switches and to the second bank of L-switches to cause the first bank of L-switches to operate in the pre-charge phase when the second bank of L-switches operate in the pumping phase,
    whereby the first bank and the second bank operate in opposite phases.

2. The RF-to-DC converter of claim 1 wherein the first control signal and the second control signal have a same frequency as the RF signal.

3. The RF-to-DC converter of claim 2 wherein a first L-switch in the first bank of L-switches has a pre-charge input to the pre-charge transistor that directly connects to the second buffered RF signal;
    wherein L-switches in the first bank of L-switches that are not the first L-switch each has a pre-charge input to the pre-charge transistor that connects to an output capacitor of a prior L-switch in the first bank of L-switches;
    wherein a first L-switch in the second bank of L-switches has a pre-charge input to the pre-charge transistor that directly connects to the first buffered RF signal;
    wherein L-switches in the second bank of L-switches that are not the first L-switch each has a pre-charge input to the pre-charge transistor that connects to an output capacitor of a prior L-switch in the second bank of L-switches.

4. The RF-to-DC converter of claim 3 wherein for the first bank of L-switches, the stage-transfer transistor is an n-channel transistor having a substrate connected to a source, wherein the stage-transfer transistor is formed in an isolated well that is isolated from other transistors;
    wherein for the first bank of L-switches, the pre-charge transistor is an n-channel transistor having a substrate connected to a source, wherein the pre-charge transistor is formed in an isolated well that is isolated from other transistors.

5. The RF-to-DC converter of claim 4 wherein the first control signal is applied to a gate of the pre-charge transistor in the first bank of L-switches;
   wherein the second control signal is applied to a gate of the stage-transfer transistor in the first bank of L-switches.

6. The RF-to-DC converter of claim 5 wherein for the second bank of L-switches, the stage-transfer transistor is an n-channel transistor having a substrate connected to a source, wherein the stage-transfer transistor is formed in an isolated well that is isolated from other transistors;
   wherein for the second bank of L-switches, the pre-charge transistor is an n-channel transistor having a substrate connected to a source, wherein the pre-charge transistor is formed in an isolated well that is isolated from other transistors.

7. The RF-to-DC converter of claim 6 wherein the second control signal is applied to a gate of the pre-charge transistor in the second bank of L-switches;
   wherein the first control signal is applied to a gate of the stage-transfer transistor in the second bank of L-switches,
   whereby the first control signal and the second control signal are cross-coupled to gates in the second bank of L-switches.

8. The RF-to-DC converter of claim 5 wherein for the second bank of L-switches, the stage-transfer transistor is a p-channel transistor having a substrate connected to a source, wherein the stage-transfer transistor is formed in an isolated well that is isolated from other transistors;
   wherein for the second bank of L-switches, the pre-charge transistor is a p-channel transistor having a substrate connected to a source, wherein the pre-charge transistor is formed in an isolated well that is isolated from other transistors.

9. The RF-to-DC converter of claim 8 wherein the first control signal is applied to a gate of the pre-charge transistor in the second bank of L-switches;
   wherein the second control signal is applied to a gate of the stage-transfer transistor in the second bank of L-switches.

10. The RF-to-DC converter of claim 3 wherein for the first bank of L-switches, the stage-transfer transistor is an n-channel transistor having a substrate connected to a second substrate control signal, wherein the stage-transfer transistor is formed in an isolated well that is isolated from other transistors;
    wherein for the first bank of L-switches, the pre-charge transistor is an n-channel transistor having a substrate connected to a first substrate control signal, wherein the pre-charge transistor is formed in an isolated well that is isolated from other transistors;
    wherein the first control signal is applied to a gate of the pre-charge transistor in the first bank of L-switches;
    wherein the second control signal is applied to a gate of the stage-transfer transistor in the first bank of L-switches;
    wherein for the second bank of L-switches, the stage-transfer transistor is an n-channel transistor having a substrate connected to the first substrate control signal, wherein the stage-transfer transistor is formed in an isolated well that is isolated from other transistors;
    wherein for the second bank of L-switches, the pre-charge transistor is an n-channel transistor having a substrate connected to the second substrate control signal, wherein the pre-charge transistor is formed in an isolated well that is isolated from other transistors;
    wherein the second control signal is applied to a gate of the pre-charge transistor in the second bank of L-switches;
    wherein the first control signal is applied to a gate of the stage-transfer transistor in the second bank of L-switches,
    whereby the first control signal and the second control signal are cross-coupled to gates in the second bank of L-switches.

11. The RF-to-DC converter of claim 10 wherein the buffer circuit generates the first substrate control signal with a same polarity as the first control signal, and generates the second substrate control signal with a same polarity as the second control signal,
    whereby substrates are actively driven high and low with a same polarity as the gates.

12. The RF-to-DC converter of claim 3 wherein the buffer circuit further comprises:
    a break-before-make circuit to generate the first control signal and the second control signal as non-overlapping signals;
    a first voltage-booster buffer to drive the first control signal high to a boosted voltage above a power voltage; and
    a second voltage-booster buffer to drive the second control signal high to the boosted voltage above the power voltage.

13. The RF-to-DC converter of claim 3 wherein the buffer circuit further comprises:
    a first voltage boosting buffer for generating the first control signal with a high-level voltage that is higher than a power voltage;
    a second voltage boosting buffer for generating the second control signal with a high-level voltage that is higher than the power voltage;
    wherein an output of a last stage in the first bank of L-switches is connected to an output of a last stage in the second bank of L-switches to supply the power voltage.

14. An energy harvesting circuit comprising:
    a first plurality of L-switches, each L-switch in the first plurality of L-switches comprising:
       a first pre-charge transistor with a channel coupled between a stage input capacitor and a stage input node;
       a first stage-transfer transistor with a channel coupled between the stage input capacitor and a stage output;
    a second plurality of L-switches, each L-switch in the second plurality of L-switches comprising:
       a second pre-charge transistor with a channel coupled between a stage input capacitor and a stage input node;
       a second stage-transfer transistor with a channel coupled between the stage input capacitor and a stage output;
    a control circuit, receiving an input from an antenna, and generating a first buffered input and a second buffered input, the control circuit also generating a first control signal and a second control signal having a same period as the input from the antenna, wherein the first control signal and the second control signal are non-overlapping alternating signals;
    a first array of capacitors each coupled to the second buffered input, the first array of capacitors each also being connected to the stage output of a first stage-transfer transistor of an L-switch in the first plurality of L-switches and to the stage input node of the first pre-charge transistor, wherein a stage output node or a prior L-switch in the first plurality of L-switches connects to a stage input node of a next L-switch in the first plurality of L-switches;
    a second array of capacitors each coupled to the first buffered input, the second array of capacitors each also being the stage input capacitor that connects to a first stage-transfer transistor of an L-switch in the first plurality of L-switches;

a third array of capacitors each coupled to the first buffered input, the third array of capacitors each also being connected to the stage output of a second stage-transfer transistor of an L-switch in the second plurality of L-switches and to the stage input node of the second pre-charge transistor, wherein a stage output node or a prior L-switch in the second plurality of L-switches connects to a stage input node of a next L-switch in the second plurality of L-switches;

a fourth array of capacitors each coupled to the second buffered input, the fourth array of capacitors each also being the stage input capacitor that connects to a second stage-transfer transistor of an L-switch in the second plurality of L-switches; and a power line for powering a circuit or for charging a battery;

wherein the stage output of a last L-switch in the first plurality of L-switches drives the power line;

wherein the stage output of a last L-switch in the second plurality of L-switches also drives the power line.

15. The energy harvesting circuit of claim 14 wherein the first plurality of L-switches comprises at least three L-switches;

wherein the second plurality of L-switches comprises at least three L-switches;

wherein the first pre-charge transistor is an n-channel transistor with a gate receiving the first control signal;

wherein the first stage-transfer transistor is an n-channel transistor with a gate receiving the second control signal.

16. The energy harvesting circuit of claim 15 wherein the second pre-charge transistor is a p-channel transistor with a gate receiving the first control signal;

wherein the second stage-transfer transistor is a p-channel transistor with a gate receiving the second control signal;

wherein the first pre-charge transistor has an isolated substrate connected to the stage input node;

wherein the first stage-transfer transistor has an isolated substrate connected to the stage input capacitor;

wherein the second pre-charge transistor has an isolated substrate connected to the stage input capacitor;

wherein the second stage-transfer transistor has an isolated substrate connected to the stage output.

17. The energy harvesting circuit of claim 15 wherein the second pre-charge transistor is an n-channel transistor with a gate receiving the second control signal;

wherein the second stage-transfer transistor is an n-channel transistor with a gate receiving the first control signal;

wherein the first pre-charge transistor has an isolated substrate connected to the stage input node;

wherein the first stage-transfer transistor has an isolated substrate connected to the stage input capacitor;

wherein the second pre-charge transistor has an isolated substrate connected to the stage input node;

wherein the second stage-transfer transistor has an isolated substrate connected to the stage input capacitor.

18. The energy harvesting circuit of claim 15 further comprising:

a first active substrate control signal, generated by the control circuit to be in phase with the first control signal;

a second active substrate control signal, generated by the control circuit to be in phase with the second control signal;

wherein the first pre-charge transistor has an isolated substrate driven by the first active substrate control signal;

wherein the first stage-transfer transistor has an isolated substrate driven by the second active substrate control signal;

wherein the second pre-charge transistor has an isolated substrate driven by the second active substrate control signal;

wherein the second stage-transfer transistor has an isolated substrate driven by the first active substrate control signal;

whereby substrates are actively driven high and low.

19. A RF-to-DC energy harvester comprising:

an antenna for receiving a Radio-Frequency (RF) signal;

a buffer circuit connected to the antenna to generate a positive buffered RF signal and a negative buffered RF signal, and a first control signal and a second control signal;

a first array of capacitors having bottom plates receiving the negative buffered RF signal;

a second array of capacitors having bottom plates receiving the positive buffered RF signal;

a first bank of L-switches, each L-switch coupled between an input capacitor in the second array of capacitors and an output capacitor in the first array of capacitors;

a third array of capacitors having bottom plates receiving the positive buffered RF signal;

a fourth array of capacitors having bottom plates receiving the negative buffered RF signal;

a second bank of L-switches, each L-switch in the second bank coupled between an input capacitor in the fourth array of capacitors and an output capacitor in the third array of capacitors;

wherein each L-switch comprises:

pre-charge transistor means for charging the input capacitor;

stage-transfer transistor means for transferring charge from the input capacitor to the output capacitor;

first control phase means, in the buffer circuit, for generating the first control signal and the second control signal to activate in the first bank of L-switches the stage-transfer transistor means to conduct and to de-activate the pre-charge transistor means to isolate and not conduct in the first bank of L-switches, and at a same time in the second bank of L-switches activating the pre-charge transistor means to conduct and to de-activate the stage-transfer transistor means to isolate and not conduct; and second control phase means, in the buffer circuit, for generating the first control signal and the second control signal to activate in the first bank of L-switches the pre-charge transistor means to conduct and to de-activate the stage-transfer transistor means to isolate and not conduct in the first bank of L-switches, and at a same time in the second bank of L-switches activating the stage-transfer transistor means to conduct and to de-activate the pre-charge transistor means to isolate and not conduct;

wherein the first control signal and the second control signal are connected to the first bank of L-switches and to the second bank of L-switches.

20. The RF-to-DC energy harvester of claim 19 further comprising:

first active substrate control means for generating a first substrate control signal that rises with the first control signal rises and falls when the first control signal falls;

second active substrate control means for generating a second substrate control signal that rises with the second control signal rises and falls when the second control signal falls;

wherein the pre-charge transistor means comprises an n-channel transistor having a gate and a substrate that is not shared with other transistors;

wherein the stage-transfer transistor means comprises an n-channel transistor having a gate and a substrate that is not shared with other transistors;

wherein an n-channel transistor receiving the first control signal on the gate also receives the first substrate control signal on the substrate for the n-channel transistor;

wherein for each pre-charge transistor means and for each stage-transfer transistor means, the substrate is actively driven high when the gate is driven high and actively driven low when the gate is driven low, whereby substrates and gates are actively driven.

* * * * *